UNITED STATES PATENT OFFICE.

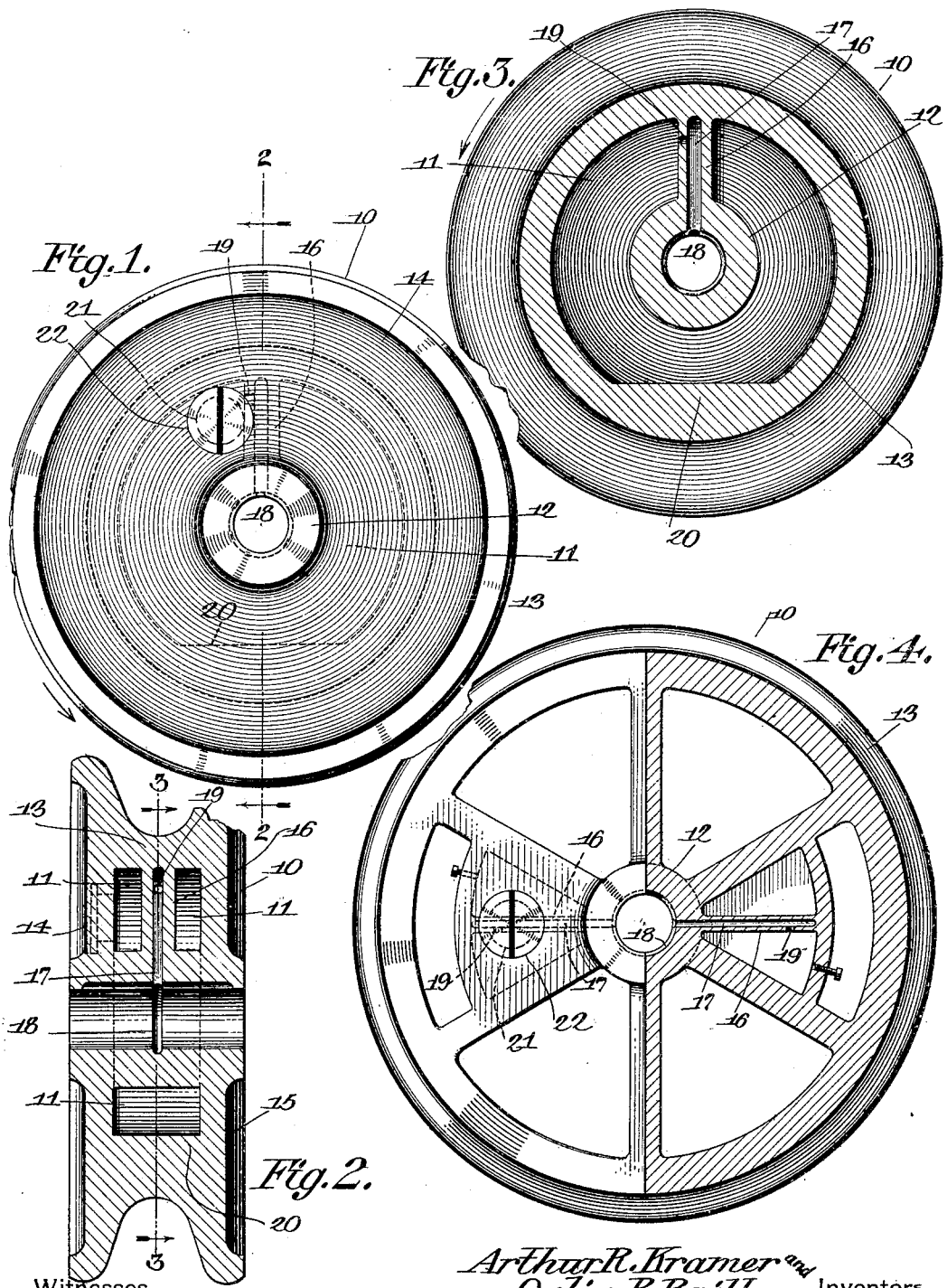

ARTHUR RAYMOND KRAMER AND ORLIN P. BRITT, OF UNIONTOWN, PENNSYLVANIA.

SELF-LUBRICATING TROLLEY-WHEEL.

No. 810,157.      Specification of Letters Patent.      Patented Jan. 16, 1906.

Application filed June 17, 1905. Serial No. 265,783.

*To all whom it may concern:*

Be it known that we, ARTHUR RAYMOND KRAMER and ORLIN P. BRITT, citizens of the United States, residing at Uniontown, in the county of Fayette and State of Pennsylvania, have invented a new and useful Self-Lubricating Trolley-Wheel, of which the following is a specification.

This invention relates to devices for the lubricating of loose pulleys, car-wheels, and the like which rotate loosely upon their shafts or axles; and the object of the invention is to provide a simple and inexpensive means integral with the pulley or wheel whereby the lubricant is supplied to the bearing of the wheel automatically and only so far as required.

With these and other objects in view the present invention consists in the combination and arrangement of parts, as will be hereinafter fully described, shown in the accompanying drawings, and particularly pointed out in the appended claim.

The improvement may be embodied in any of the various constructions of pulleys or wheels in ordinary use which rotate upon their axles or shafts—such as the trolley-wheels of electric railways, some forms of car-wheels, and the like—and which therefore require constant lubrication and for the purpose of illustration is shown embodied in an electric trolley-wheel of ordinary construction and also in an approved form of car-wheel—such, for instance, as are employed beneath mining-cars.

In the drawings thus employed, Figure 1 is a side elevation of a trolley-wheel with the improvement applied. Fig. 2 is a section on the line 2 2 of Fig. 1. Fig. 3 is a section on the line 3 3 of Fig. 2. Fig. 4 is a view, partly in section, of a flanged car-wheel with the improvement embodied therein in a modified form.

The improved wheel (represented as a whole at 10) is formed with a chamber 11 for lubricating material between the hub 12 and rim 13 and inclosed by side walls 14 15, the rim, hub, and side walls being integral, as represented in Fig. 2. Extending from the hub 12 to the rim 13 is a tubular member 16, integral with the other portions of the wheel and disposed centrally of the chamber 11 and connected at the ends only to the hub and rim, so that the lubricant surrounds the same upon all sides. Extending longitudinally through the member 16 is an oil-duct 17, leading at the inner end through the hub 12 and merging in a channel 18, encircling the interior of the hub and serving to conduct the lubricant to the axle-journal. Leading laterally from the tubular member 16 and communicating with the duct 17 is a branch duct 19, opening in the direction of the line of movement of the wheel and providing means for the passage of the lubricant to the main duct and thence to the journals. Thus it will be obvious that as the wheel rotates in the direction of the arrow in Fig. 1 the oil will be forced into the branch duct or aperture 19, and as the branch duct is the only entrance to the main duct or conduit 17 the oil will be positively fed to the channel 18, and thence to the journal, continuously and in uniform quantities. The branch duct being located near the rim 13 and the oil in the chamber being maintained thereby against the interior of the rim by the centrifugal force generated by the rotative movement of the wheel, the branch duct will be in position to receive oil so long as any oil remains in the chamber.

The interior of the wheel 10, as in Figs. 1, 2, and 3, is formed of increased thickness, as at 20, at the side opposite the member 16 to counterbalance the weight of the latter and cause the wheel to run true.

When employed upon wheels running in either direction, two of the duct members 17 will preferably be employed, as in Fig. 4, with the branch ducts 19 opening in the same direction, one branch duct operating when the wheel is running in one direction and the other branch duct operating when the wheel is running in the opposite direction.

A relatively large aperture 21 is formed through one of the side walls, as 14, adjacent to the lateral duct 19 and fitted with a cap 22, preferably screwed into the aperture through which the lubricant is supplied, and also through which the core-sand may be extracted from the chamber 11 after the casting of the wheel. The aperture 21 also provides means whereby the lateral duct 19 may be cleared from obstructions when required.

With wheels thus constructed and the chamber 11 charged with lubricating material as the wheels revolve the lubricant flows to the journal through the ducts in limited quantities and is applied to the journals only so fast as required, so that no waste of the lubricant occurs. The journals will thus be automatically lubricated and the lubrication continued so long as oil remains in the chamber 11.

Having thus described the invention, what is claimed is—

A cast wheel having a tubular hub, an integral oil-chamber between the hub and the rim of the wheel, an integral web within the chamber and extending between the inner and outer ends thereof, said web having a longitudinal passage closed at its outer end and extending through the hub into communication with the interior thereof, there being a lateral entrance-opening piercing the web into communication with the passage, one side of the chamber being provided with an opening adjacent the entrance-opening of the passage of the web, said opening serving for the removal of the core from the chamber, to permit filling of the chamber and to give access to the entrance-opening for removing obstructions therefrom, and a removable closure for the opening.

In testimony that we claim the foregoing as our own we have hereto affixed our signatures in the presence of two witnesses.

ARTHUR RAYMOND KRAMER.
ORLIN P. BRITT.

Witnesses:
    JNO. BOYLE,
    D. F. COLLINS.